United States Patent
Yadav et al.

(10) Patent No.: US 10,289,535 B2
(45) Date of Patent: May 14, 2019

(54) SOFTWARE TESTING INTEGRATION

(71) Applicant: ACCENTURE GLOBAL SOLUTIONS LIMITED, Dublin (IE)

(72) Inventors: Sanjay K. Yadav, Kanpur (IN); Gaurav Yadav, Thane (IN); Ashutosh Deodhar, Kalyan Thane (IN); Haresh T. Hiranandani, Ulhasnagar Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 253 days.

(21) Appl. No.: 15/597,762

(22) Filed: May 17, 2017

(65) Prior Publication Data
US 2017/0344467 A1    Nov. 30, 2017

(30) Foreign Application Priority Data
May 31, 2016 (IN) .............. 201641018603

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01); *G06F 11/3696* (2013.01)

(58) Field of Classification Search
CPC .. G06F 11/008; G06F 11/079; G06F 11/3409; G06F 11/3452; G06F 11/3604; G06F 11/3612; G06F 11/366; G06F 11/3668; G06F 11/3672; G06F 11/3688

USPC .......................................... 714/25, 37, 38.1
See application file for complete search history.

(56) References Cited

U.S. PATENT DOCUMENTS

| | | | |
|---|---|---|---|
| 6,546,524 B1 | 4/2003 | Chankramath et al. | |
| 7,039,912 B1 | 5/2006 | Moulden, Jr. et al. | |
| 8,484,624 B1 * | 7/2013 | Srinivasan | G06F 11/3684 717/126 |
| 8,904,358 B1 | 12/2014 | Peri-Glass et al. | |
| 2003/0121025 A1 | 6/2003 | Farchi et al. | |
| 2004/0153822 A1 | 8/2004 | Arcand et al. | |
| 2007/0083630 A1 | 4/2007 | Roth et al. | |
| 2013/0139127 A1 * | 5/2013 | Vecera | G06F 11/368 717/125 |
| 2015/0058668 A1 * | 2/2015 | Fan | G01R 31/2894 714/30 |
| 2015/0143335 A1 * | 5/2015 | Jain | G06F 8/71 717/121 |
| 2015/0370685 A1 * | 12/2015 | Heymann | G06F 11/368 714/38.1 |
| 2017/0153969 A1 * | 6/2017 | Kshirsagar | G06F 11/3688 |

* cited by examiner

*Primary Examiner* — Sarai E Butler
(74) *Attorney, Agent, or Firm* — Mannava & Kang, P.C.

(57) ABSTRACT

A software integration testing tool includes drivers for different software testing tools to test a system under test, and an application program interface for a test management tool. The software integration testing tool determines configuration parameters for the software testing tools and the test management tool. Based on the configuration parameters, the drivers can be executed to extract test results from the software testing tools and call the application program interface to integrate the test results with the test management tool.

20 Claims, 5 Drawing Sheets

SOFTWARE TESTING INTEGRATION

BACKGROUND

Software testing is becoming increasingly important. Owners, operators, and users of computer software expect and demand high standards of reliability. There are many well-known approaches and many available software tools for software testing, which adds to the complexity of software testing. It is not uncommon to use multiple different software testing tools to test different aspects and functionalities of the software, especially for complex systems. For example, various software testing tools may be used to execute a series of application program interface (API) calls against service endpoints, which may be on the cloud or on a private server, and validate the responses received from the endpoints. Other software testing tools may be used for testing cross-platform functionality. Yet other tools may be used for regression testing, which may include testing changes to computer programs to make sure that the older programming still works with the new changes, and yet other tools may be used to test web applications. In addition, test management software may be used to manage the lifecycle of software.

Furthermore, software testing can be made more complex due to the large number of tests that are executed to test the software. For example, during various phases of testing, a series of test cases may be generated by a tester or developer, and executed using a particular software testing tool to test various functionalities of the of software under test. For a complex software, thousands of tests may be executed daily, such as for regression testing. Accordingly, in addition to the use of multiple software testing tools, the number of test cases that may be executed adds to the complexity of software testing.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
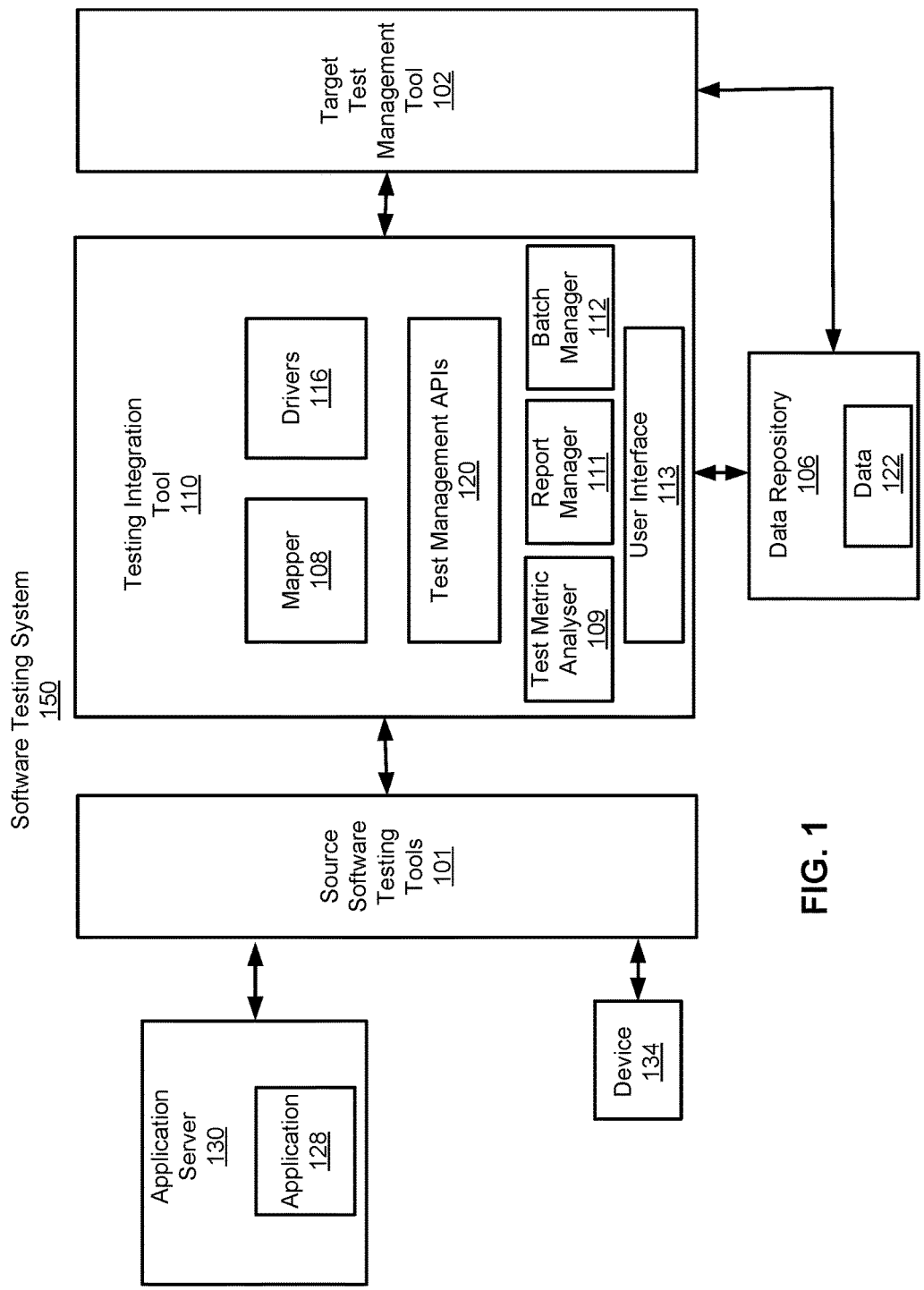
FIG. 1 illustrates a block diagram of a software testing system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. Throughout the present disclosure, the terms "a" and "an" are intended to denote at least one of a particular element. As used herein, the term "includes" means includes but not limited to, and the term "including" means including but not limited to. The term "based on" means based at least in part on.

According to examples of the present disclosure, a testing integration tool can integrate software test results from manual tests and automated software testing tools. For example, the testing integration tool can automatically extract and integrate test results from multiple software testing tools to a test management tool. Accordingly, the testing integration tool can minimize the manual efforts required to compare, validate and analyze test results across different software testing tools, and facilitate generation of a portfolio view of end-to-end, test release, status where multiple software testing tools are used in tandem with a test management tool.

When testing a complex software application, thousands of tests may be executed using many different software testing tools. For example, to test a cloud service, production validation testing was performed which included sanity, regression and manual testing. In addition, after each geographic zone of the cloud service went live, daily regression testing was done to perform daily health check. More than 1000 test cases were executed as part of a regression run. With more than 20 zones that went live, over 20,000 test cases were executed as part of a daily health check. Accordingly, over 20,000 test cases are executed per day. According to estimates, it may take 30 seconds per test case to integrate test results to a test management tool without using the testing integration tool. Thus, the total estimated time required in hours for 21,000 test cases is as follows: $21000*30/(60*60)=175$ hours. The testing integration tool, according to an example of the present disclosure, is estimated to be able to integrate the test results for the 21,000 test cases in 0.7 hours, which is significant time savings. Often software development is on a stringent timeline, and the manual extraction process wastes a significant amount of man hours that can put the project behind schedule. The testing integration tool can eliminate this manual process for example by mapping the test results to corresponding test cases of the test management tool, and automatically uploading the test results to the test management tool. Also, once the test results are provided to the test management tool, a view may be generated of end-to-end, test release, status where multiple software testing tools are used in tandem.

The testing integration tool can be customized for different users. For example, a first user may desire to use a first test management tool and a second user may desire to use a different test management tool. Also, different users may use different automated software testing tools. The testing integration tool can accommodate the requirements for different users using a configuration file for each user that specifies the requirements for each user. Also, the testing integration tool can generate different customized reports for different users based on the test results for each user.

The testing integration tool may execute predictive analytics on test results. For example, the testing integration tool may fetch test results for multiple releases to determine trends or patterns from the execution results. Based on the analytics, the testing integration tool may identify particular functionalities that have defects greater than a predetermined threshold over time and generate predictions for a future release based on the pattern of defects for the functionality. If a functionality is predicted to have a defect, then developers can focus their testing and remediation of defects for the functionality prior to the future release to avoid the defects. In an example, if a functionality is predicted to have a number of defects greater than a threshold, the functionality is scheduled for manual testing prior to the new release to provide additional validation that the functionality is properly operating prior to deploying the new release into production.

In an example, the testing integration tool may be implemented as a cloud service hosted on a cloud platform. In another example, the testing integration tool may be hosted on a local server or another type of computer. Various types of platforms may be used to implement the testing integration tool.

The testing integration tool may provide simultaneous extraction of test results from automated software testing tools through multithreading. For example, instead of extracting test results one-by-one from automated testing tools, the testing integration tool may create multiple threads to interact with multiple automated testing tools simultaneously for extracting test results and performing other operations.

"Tool" as used herein may include machine readable instructions executable by hardware, such as a processor. The machine readable instructions may be stored on a non-transitory computer readable medium, such as memory, hard disk or some other form of computer storage.

The testing integration tool may execute test results generated from testing batch jobs. For example, multiple test suites of test cases may be executed in a testing batch job overnight. The testing integration tool may automatically determine when the testing batch job is completed, and extract the test results from the execution of the test suites for uploading to a selected test management tool. In an example, the batch job may execute 50 test cases. The testing integration tool may determine when all 50 test cases are completed before extracting the test results for the 50 test cases. In an example, the testing integration tool may poll the software testing tool periodically or periodically check test results that are populated as the test cases are completed to determine whether the test cases have been executed.

An automated software testing tool is capable of automatically executing tests and reporting outcomes. Tests carried out with an automated software testing tool may be run repeatedly, at any time of day. The automated tests may include execution by the automated software tool of a series of predefined actions that can occur in the software being tested, and determine whether the execution of the actions passed or failed. Manual testing may include a human tester executing the software and using it just like any other user would. By interacting with the software, the manual tester can compare expectations for how the software should run with outcomes, and then provide feedback on what didn't work. The testing integration tool can integrate software test results from both manual testing and testing performed by automated software testing tools.

FIG. 1 illustrates a block diagram of a software testing system 150, according to an example of the present disclosure. A software testing integration tool 110, also referred to as testing integration tool 110, may integrate testing results of tests performed by source software testing tools 101, also referred to as software testing tools 101, on a system under test (SUT). The SUT is by way of example software application 128 but may include any type of software system. For example, the SUT may include a cloud service that is deployed across distributed computer resources in different geographic zones. The test cases may include daily executed sanity, regression and manual tests for each zone for performing a daily health check. The tests may include over one thousand test cases in certain instances that are executed daily by the software testing tools 101. The testing integration tool 110 can automatically extract the test results for the test cases and integrate the test results with test management tool 102. The test management tool 102 can provide a view of the test results across the zones to determine health of the SUT and to detect and remediate recurrent issues with the SUT across the zones.

The application server 130 may host and execute the software application 128. A tester or developer or another type of user may use device 134 to create test cases for execution by the source software testing tools 101 to test the software application 128. The device 134 may be any suitable computer. The test cases may be provided to the source software testing tools 101 or to target test management tool 102, which is described below, for execution by the source software testing tools 101.

The software testing tools 101 may include substantially any type of software testing tool. For example, the software testing tools 101 may include tools to execute a series of application program interface (API) calls against service endpoints in the SUT, which may be on the cloud or a private server, and validate the responses received from the endpoints. Other software testing tools may be used for cross-platform functional testing, regression testing, or web application testing. In addition, test management software may be used to manage the lifecycle of software. Some examples of automated software testing tools that may be used for the software testing tools 101 include the following: TEMPEST, which is a set of functional integration tests intended to be run against actual OPENSTACK deployments; SOAPUI which allows creation and execution of automated functional, regression, compliance, and load tests; Unified Functional Testing (UFT) software, which provides functional and regression test automation for software applications and environments; and SELENIUM, which automates browsers for automating web application testing.

The testing integration tool 110 may extract the test results from the software testing tools 101, and provide the test results to target test management tool 102, also referred to as test management tool 102. Also, test results that are generated manually and stored in a predetermined location may be extracted by the testing integration tool 110 and provided to the target test management tool 102. Providing test results to the target test management tool 102 may include storing the test results in data repository 106 used by the target test management tool 102, which may be a database or another type of data storage. The data repository 106 may be used by the test management tool 102 to store data 122, which may include test results extracted by the testing integration tool 110 from the software testing tools 101 and stored in the data repository 106. The data repository 106 may store other information pertinent to the software testing and used by the test management tool 102.

The test management tool 102 may include software used to manage tests executed through an automated software testing tool or executed manually that have been previously specified by a test procedure. The test management tool 102 may analyze test results, including the test results from test cases executed by the software testing tools 101. The test management tool 102 may include requirement and/or specification management modules that allow automatic generation of a requirement test matrix (RTM), which is a commonly used metric to indicate functional coverage of the SUT, such as the software application 128. An example of the test management tool 102 may include an Application Lifecycle Management (ALM) tool. Open source and/or proprietary ALM tools may be used. The test management tool 102 may facilitate management, test planning, developer management, defect management and other operations associated with software testing.

The testing integration tool 110 may include mapper 108, drivers 116, and test management APIs 120. The testing integration tool 110 can automatically integrate, including extracting and uploading, test results from the software testing tools 101 with the test management tool 102. For example, the testing integration tool 110 may extract test results from the software testing tools 101 and send the test results to the test management tool 102 for integration with other test results. This enables the test management tool 102 to provide a complete end-to-end analysis of test results from multiple different software testing tools testing different functionalities and aspects of a software system. Also, the testing integration tool 110 includes a test metric analyzer 109 that can analyze the test results from the software testing tools 101 to determine trends and generate reports and alerts based on the analysis. The analysis may include analytics for making predictions based on detected patterns in the test results.

The mapper 108 maps test results associated with test cases to test cases of the test management tool 102. For example, the mapper 108 stores test case names used by the software testing tools 101, referred to as source test case names, and corresponding test names used by the test management tool 102, referred to as target test case names. The test management tool 102 may have a different test case name than the test case name used by a software testing tool for the same test case. For example, the test case name for testing a login function of the application 128 is login_test1 in one of the software testing tools 101, and the same test case is called weapp_login_test1 by the test management tool 102. The mapper 108 associates the different test case names that represent the same test case, and may also stores test results extracted from the software testing tool with the associated test case names. In an example, the mapper 108 may include a spreadsheet with columns for the associated test case names used by the software testing tools 101 and the test management tool 102 and a column for the test results. Other mechanisms or data structures may be used for the mapper 108.

The drivers 116 may include a driver for each of the software testing tools 101. The drivers 116 may extract test results from the software testing tools 101 and may call an API of test management APIs 120 for the test management tool 102 to connect to the test management tool 102 and to integrate extracted test results from the software testing tools 101 with the test management tool 102. The testing integration tool 110 may connect to multiple test management tools, and may include multiple test management APIs to connect to them. The drivers 116 may include multiple drivers to facilitate integrating test results with multiple test management tools. The drivers 116 may pass parameters to the test management tools. For example, a driver of the driver 116 may be associated with a particular one of the software testing tools 101. Also, an API of the test management APIs 120 may be associated with a particular test management tool, such as the test management tool 102. The drivers 116 and other components of the testing integration tool 110 may include machine readable instructions stored on a non-transitory computer readable medium.

To provide test results to the test management tool 102, the driver, for example, identifies the corresponding test management API for the test management tool 102 and invokes it to establish a connection with the test management tool 102 and/or the data repository 106. The driver passes parameters to the test management tool 102 with test results previously extracted from the software testing tools 101. The parameters may specify the test cases associated with the test results to allow the test results to be associated with the test cases when stored in the data repository 106.

Batch manager 112 may integrate test case batch jobs executed by the software testing tools 101 into the test management tool 102. For example, the batch manager 112 may determine whether a batch job including a plurality of the test cases for a software testing tool has completed execution of test cases in the batch job. For example, the batch manager 112 determines whether test results for the batch job are stored in a predetermined location or the batch manager 112 may get a notification from the software testing tool indicating the batch job is completed or the software testing tool may set a flag indicating completion of the batch job. A flag may be an indicator stored in a file or sent in a message specifying whether the batch job is completed. In response to determining the batch job has completed, the test results for the batch job are retrieved from the predetermined storage location and may be sent via an API to the test management tool 102. In response to determining the batch job has not completed, the batch manager 112 may wait for the batch job to be completed to retrieve the test results and to send to the test management tool 102.

The testing integration tool 110 may integrate the test results from the software testing tools 101 into the test management tool 102, and the test management tool 102 may provide a view of the test results over all the functionalities that were tested. The testing integration tool 110 may also analyze metrics determined from the test results of the software testing tools 101. Test metric analyzer 109 may execute predictive analytics on test results. For example, test results for multiple releases of the application 128 are analyzed to determine trends or patterns from the execution results. Based on the analytics, particular functionalities having defects greater than a predetermined threshold over time are identified and used to generate predictions for a future release based on the pattern of defects for the functionality. If a functionality is predicted to have a defect, then developers can focus their testing and remediation of defects for the functionality prior to the future release to avoid the defects. In an example, if a functionality is predicted to have a number of defects greater than a threshold, the functionality is scheduled for manual testing prior to the new release to provide additional validation that the functionality is properly operating prior to deploying the new release into production. In an example, the test metric analyzer tracks failure rates of the test cases executed by the software testing tools 101, and determines trends in the failure rates over a plurality of versions of the application 128. A visualization presenting the trends may be generated in user interface 113, which may be a graphical user interface (GUI). Also, an alert of the trends may be generated for transmission to at least one user to notify of the predictions.

Report manager 111 may generate reports based on the analyzed metrics. Customized reports may be generated. Some examples of the reports may include reports describing test execution progress, such as daily execution target vs passed chart, defect pareto chart, defect by severity chart, open defects age, and defect trend. The reports may be displayed via the user interface 113 or transmitted to particular destinations.

Figure 2:
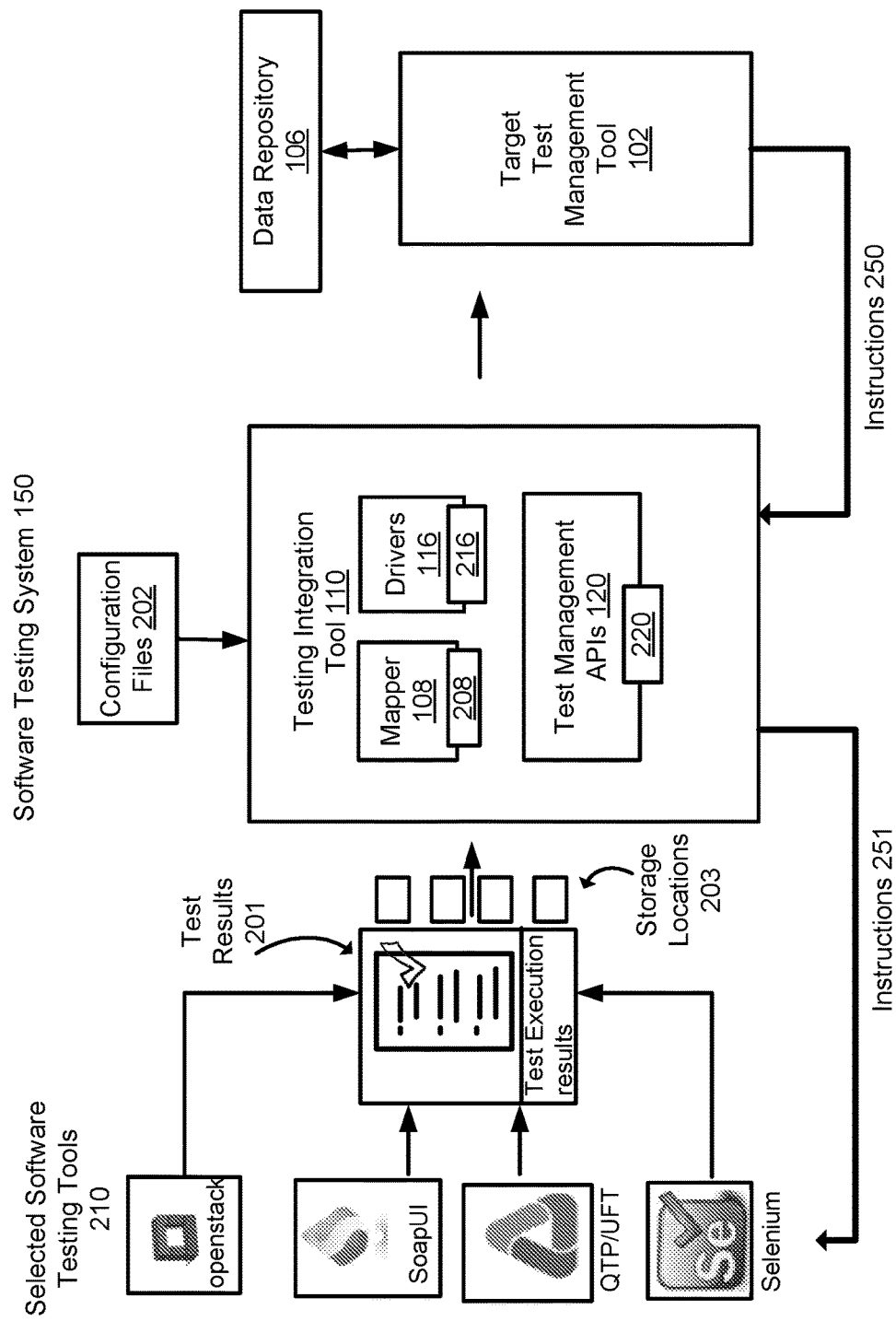
FIG. 2 illustrates a data flow diagram of the software testing system, according to an example of the present disclosure.

FIG. 2 illustrates a flow diagram of the software testing system 150, according to an example of the present disclosure. Examples of the software testing tools 101 are shown as 210. In an example, software testing tools 210 may include a subset of the software testing tools 101 that are selected based on the test results to be extracted, as is further discussed below. The software testing tools 101 generate test results 201 for example from executed test cases. The test results for the software testing tools 101 may be stored in files, and the files may be in different formats for different software testing tools. In an example, one or more spreadsheets are used to store the test results from the software testing tools 101, and another software testing tool stores its test results in an XML file. However, the test results 201 may be stored in tables, text files or any other suitable data structure. Also, each software testing tool may store its test results in a different storage location.

The testing integration tool 110 may determine configuration parameters for the software testing tools 101. Configuration parameters for each of the software testing tools 101 may include the storage location, such as file path and filename, and file format of the file storing the test results. Storage locations 203 are shown for storing the test results 201 from the software testing tools 210. The configuration parameters may also include source test case names for test cases to be executed by the software testing tool. The testing integration tool 110 may also determine configuration parameters for the test management tool 102 and any test management tool for which the testing integration tool 110 can integrate test results from the software testing tools 101. The configuration parameters for the test management tool 102 may include a storage location of data repository 106 that stores the test results 201 extracted from the software testing tools 210. The configuration parameters for the test management tool 102 may also include the target test case names used by the test management tool 102. The configuration parameters for the software testing tools 101 and the test management tool 102 may be stored in one or more configuration files 202 that are accessible by the testing integration tool 110. The configuration parameters in the configuration files 202 may be entered by a user and/or may be provided from the software testing tools 101 and the test management tool 102. The testing integration tool 110 may open the configuration files 202 to determine the configuration parameters.

The testing integration tool 110 accesses the test results 201 from the one or more files and maps the test results 201 to test cases in the test management tool 102. The testing integration tool 110 sends the test results 201, along with the mapping information, to the test management tool 102 using a driver and API. The test management tool 102 receives the test results 201 and the mapping information and stores the test results 201 with associated test case information based on the mapping information. Subsequently, the stored test results 201 may be analyzed and reported by the test management tool 102.

The testing integration tool 110 determines and stores mappings 208 between the source test case names of the software testing tools 101 and target test case names used by the test management tool 102 that correspond to the source test case names of the software testing tools 101. For example, the mapper 108 determines the mappings 208 and may store the mappings 208 in a spreadsheet or another type of file. For example, a mapping may include associating login_test1 which is a test case name in one of the software testing tools 210, and weapp_login_test1 which is the target test case name used by the target test management tool 102 for the same test case. The mapper 108 associates the different test case names that represent the same test case, and may also stores test results extracted from the software testing tool with the associated test case names in the mappings 208. The mappings of different test case names that represent the same test case may be determined from the configuration parameters discussed above and/or user input.

The testing integration tool 110 may store multiple drivers 116 and multiple test management APIs 120. The testing integration tool 110 may execute a subset of the drivers 116 that correspond to a subset of the software testing tools 101 for which test results are to be extracted. In an example, a user may select test cases for extraction through the user interface 113. The testing integration tool 110 identifies the drivers for the software testing tools 210 that are executing the selected test case. These drivers are shown as drivers 216. Similarly, a test management API 220 may be identified from the test management APIs 120 that corresponds to a selected test management tool, such as test management tool 102. For example, the testing integration tool 110 may be able to integrate extracted test results with multiple test management tools. A test management tool may be selected by a user, such as the test management tool 102. The testing integration tool 110 determines the API that is for the selected test management tool, such as the API 220. The API 220 may be used to connect to the test management tool 102.

The drivers 216 may extract test results for each of the software testing tools 210. For example, each of the drivers 216 determines from the configuration parameters for the software testing tools 210, the storage locations 203. The drivers 216 may retrieve the test results 201 from the storage locations 203. The drivers 216 may be executed simultaneously to simultaneously retrieve the test results for the software testing tools 210 in parallel. Each of the drivers 216 may determine, from the mappings 208, the source test case names for the test cases executed by the respective software testing tool, and may store the test results in the mappings 208 with its source test case name and associated target test case name used by the target test management tool 102.

In an example, each of the software testing tools 210 stores the test results for test cases that it executed in a file having a predetermined file format in one of the storage locations 203. The driver determines the file format for the test result file and parses the file according to the file format to identify the test case results for extraction. In an example, if a file is XML, a Document Object Model (DOM) or tree structure for the XML is determined, and the DOM is traversed node by node to find the test results to extract. In another example, a regex operation may be executed on the file to extract test results for a particular test case or to extract test results for multiple test cases. The extracted test results for each test case, which may include pass, fail, whether a test case was executed and/or other information, may be stored with its associated source and target test case names in the mappings 208.

In an example, the drivers 216 may determine whether the test cases for the software testing tools 210 were executed. An indication of whether a test case was executed may be provided by the software testing tools 210. If a test case was not executed, the driver may send an instruction to the corresponding software testing tool to execute the test case. In response to determining the test cases were executed, the drivers 216 retrieve the test results and store the test results in the mappings 208. If test cases are executed in batch jobs, a driver may determine whether the batch job is completed before retrieving the test results.

In an example, the drivers 216 may determine a subset of all the test results to be extracted from all the executed test cases of the software testing tools 210. The subset of test results to extract may be determined from instructions or a query received from the test management tool 102 or received via user interface 113 or may be specified in the configuration files 202.

The drivers 216 may execute a call to the API 220 to integrate the extracted test results with the test management tool 102. For example, the drivers 216 execute calls to the API 220 to connect the testing integration tool 110 to the test management tool 102. The drivers 216 extract, from the stored mappings 208, the test results and the associated target test case names, and integrate, via the API 220, the extracted test results and the target test case names with stored test results in the data repository 106. The integrating may include sending the extracted test results and target test case names to the test management tool 102 via the API 220 for storage in the data repository 106. Then, the test management tool 102 may run reports on the test results from the software testing tools 210, which may include daily regression test reports or other types of reports.

In an example, the testing integration tool 110 may execute one or more feedback loops. For example, one or more of the executed test cases may fail. The test management tool 102 may identify the failed test cases from the test results provided to the test management tool 102 by the testing integration tool 110. Developers may execute code modifications to fix failed test cases and provide indications of when the code modifications are completed to the test management tool 102. The test management tool 102 may send instructions 250 to the testing integration tool 110 to execute the test cases for which the code modifications were completed. The testing integration tool 110 receives the instructions 250 and identifies, based on the instructions 250, which test cases need to be executed. From the test cases identified based on the instructions 250, the testing integration tool 110 may determine which software testing tool is responsible for executing each test case. In an example, the mappings 208 may identify the software testing tool that executes each test case, and the testing integration tool 110 may identify the driver that corresponds to the software testing tool for each test case specified in the instructions 250. Then, the identified driver may send instructions 251 to the associated the software testing tool to execute the test cases. For example, the instructions 251 may include the source test case names and instructions to execute the source test cases identified by the source test case names and/or to execute test suites including the source test cases. Then, the testing integration tool 110 may extract the test results after the source test cases are executed and provide the test results to the test management tool 102, such as discussed above.

Figure 3:
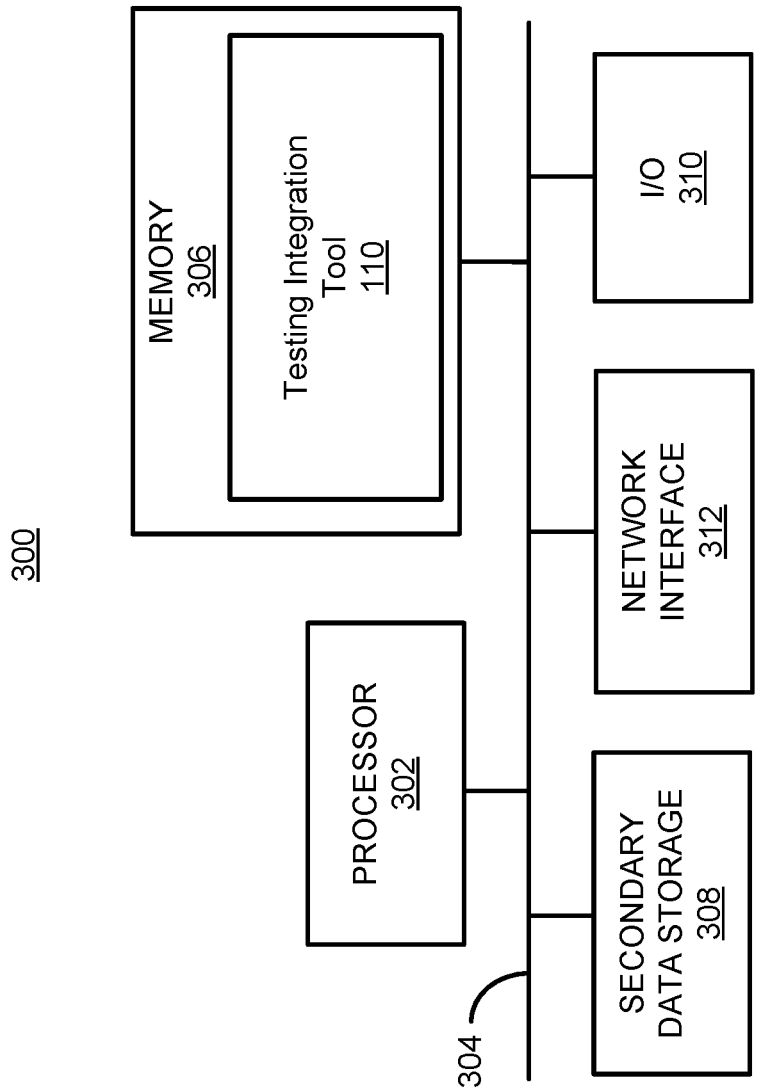
FIG. 3 illustrates a hardware block diagram of a computing platform that may support one or more of the components of the software testing system, according to an example of the present disclosure.

FIG. 3 shows a computer system 300 that may be used with the examples described herein. The computer system may represent a computational platform that includes components that may be in a server or another computer system. The computer system 300 may be used as part of a platform for the testing integration tool 110. The computer system 300 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 may include a processor 302 that may implement or execute machine readable instructions performing some or all of the methods, functions and other processes described herein. Commands and data from the processor 302 may be communicated over a communication bus 304. The computer system may also include a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include the testing integration tool 110 including machine readable instructions residing in the memory 306 during runtime and executed by the processor 302. The data storage 308 may store any data and machine readable instructions used by the testing integration tool 110, such as the configuration files 202, mappings 207, drivers 116, test management APIs 120, etc.

The computer system 300 may include an I/O device 310, such as a keyboard, a mouse, a display, etc. The computer system may include a network interface 312 for connecting to a network. Other known electronic components may be added or substituted in the computer system. The processor 302 may be designated as a hardware processor. The processor 302 may execute various components of the testing integration tool 110.

In an example, the testing integration tool 110 may be provided as a cloud service. The computer system 300 may include computing resources in the cloud hosting the testing integration tool 110. In another example, the testing integration tool 110 may execute on a server, which may be in a company's data center, rather than on the cloud.

Figure 4:
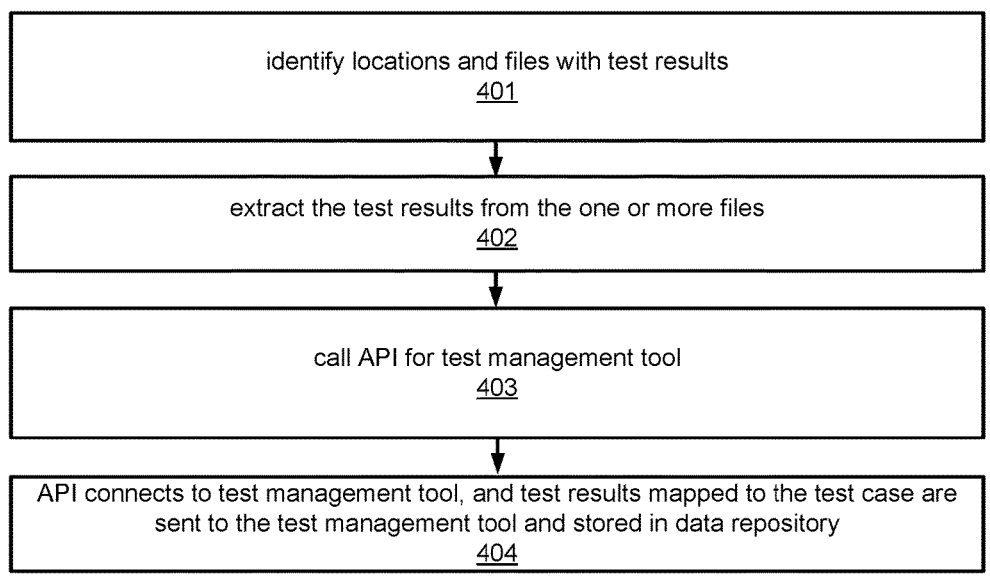
FIG. 4 illustrates a method, according to an example of the present disclosure.

FIG. 4 illustrates a method 400, according to an example of the present disclosure. The method 400 may be performed by the testing integration tool 110. At 401, the testing integration tool 110 determines a storage location of the test results 201. The storage location may be provided by user input or may be provided in a configuration file and may include the storage locations of one or more files storing the test results 201. In an example, the software testing tools 101 are configured to store the test results 201 in a spreadsheet and/or another type of file.

At 402, the testing integration tool 110 extracts the test results 201 from the one or more files. For example, drivers of the drivers 116 are identified for the software testing tools 101 that are executing the test cases. The drivers are executed to extract the test results from the storage locations. For example, test cases may be executed by the source software testing tools 101. The test cases may be stored in the test management tool 102 or information identifying the test cases may be stored in the test management tool 102. A test case is a set of conditions or variables under which a tester will determine whether a system under test satisfies requirements or works correctly. Some of the information that may be included in a test case is as follows: Test Case ID—the ID of the test case; Test Case Summary—The summary/objective of the test case; Related Requirement—The ID of the requirement this test case relates/traces to; Prerequisites—Any prerequisites or preconditions that must be fulfilled prior to executing the test; Test Procedure—Step-by-step procedure to execute the test; Test Data—The test data, or links to the test data, that are to be used while conducting the test; Expected Result—The expected result of the test; Actual Result—The actual result of the test; to be filled after executing the test; Status—Pass or Fail. Other statuses can be 'Not Executed' if testing is not performed and 'Blocked' if testing is blocked; Remarks—Any comments on the test case or test execution; Created By—The name of the author of the test case; Date of Creation—The date of creation of the test case; Executed By—The name of the person who executed the test; Date of Execution—The date of execution of the test; and Test Environment—The environment (Hardware/Software/Network) in which the test was executed. Some or all of this information may be provided with the test results for each test case and extracted by the driver.

To extract the test results mappings of test cases to test results may be stored and used to extract the test results. For example, the mapping identifies a test result based on its location in the spreadsheet or information in the test result, and associates it with a test case. The mapper 108 may use the stored mappings to identify the corresponding test case for a test result. The mapping may be used to associate or link the test result with the test case when it is stored in the test management tool 102, such as in data repository 106.

In another example, the mapper 108 may determine the mapping based on analysis of the test results 201. For example, a keyword may associate a test result with a test case. The mapper 108 may identify the keyword from a test result and associate it with the corresponding test case. The keyword may be an identifier or may be a description of the test case or a test case name.

Multiple test management tools may be used with the testing integration tool 110. At 403, for example, the test management tool 102 is identified, and the API for the test management tool 102 is called. At 404, the API connects to the test management tool 102, and the test results mapped to the test cases are sent to the test management tool 102 and stored at the data repository 106.

The testing integration tool 110 may perform additional functions. For example, the testing integration tool 110 may perform defect logging, including storing defects identified from the test results 201. Also, the testing integration tool 110 may perform analytics. For example, may estimate defect rates prior to execution of tests. For example, the test results of the tested version identify a 20% defect rate for functional area 1 and a 30% defect rate for functional area 2. This information and other historic defect rates are used to predict defect rates of functional areas of new versions before start of next version testing.

The testing integration tool 110 may integrate test results from batch jobs, which execute test cases, as well as based on real-time execution of test cases. Also, the testing integration tool 110 may be compatible with ERP and other systems. The testing integration tool 110 may utilize multi-threading to execute test cases with different tools simultaneously. Also, the testing integration tool 110 may generate single view charts showing failures and other metrics based on the extracted test results 201.

Figure 5:
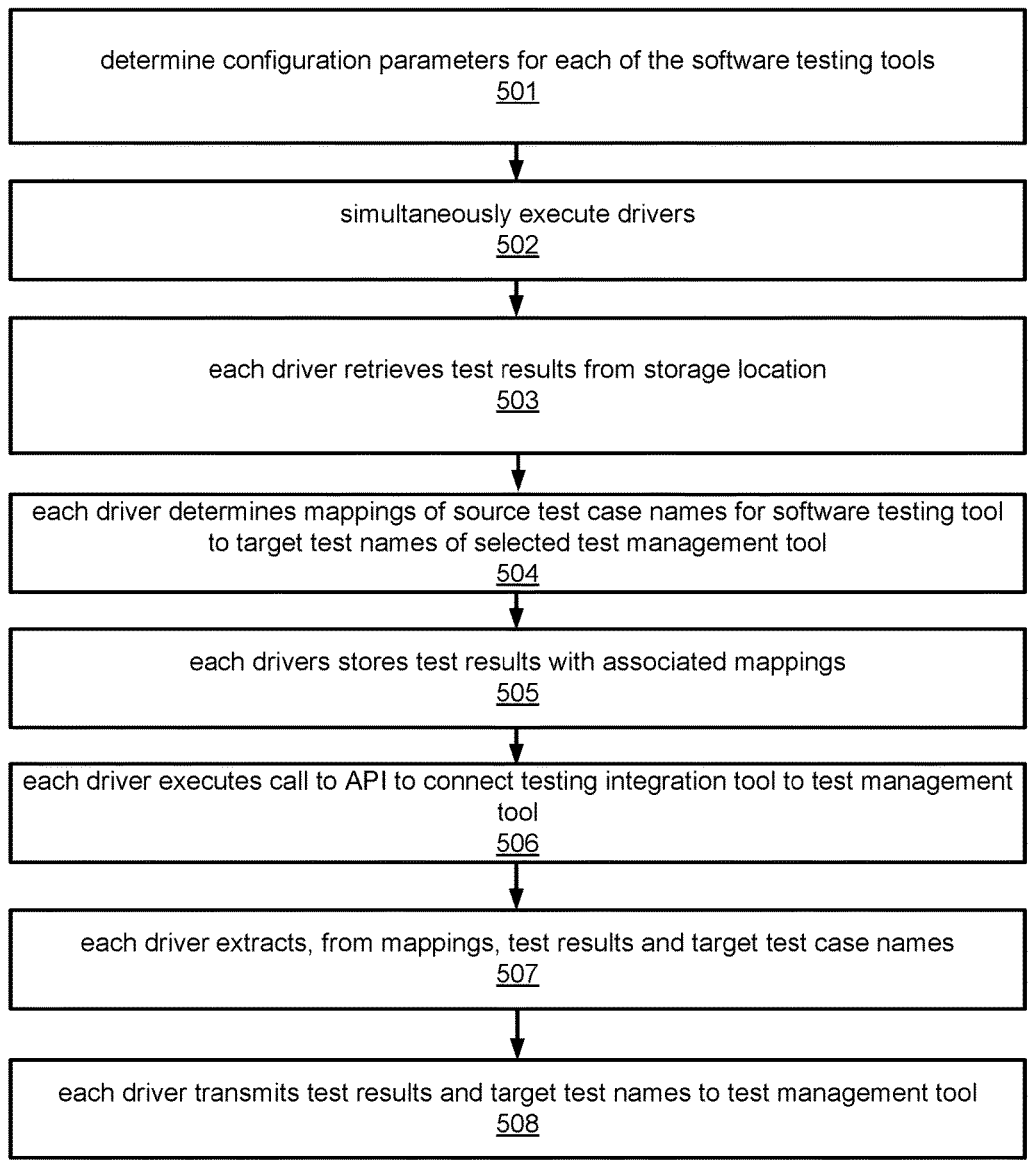
FIG. 5 illustrates a method, according to another example of the present disclosure.

FIG. 5 illustrates a method 500, according to another example of the present disclosure. The method 500 may be performed by the testing integration tool 110, such as shown by way of example in FIG. 2. The method 500 may be for simultaneously executing the drivers 216 for software testing tools 210 to extract test results from the software testing tools 210 and send the test results to the test management tool 102. At 501, configuration parameters for each of the software testing tools 210 are determined. For example, the configuration files 202 may specify the storage locations 203 for the software testing tools 210 to store the test results 201 for the software testing tools 210, and may specify other configuration parameters. At 502, each of the drivers 216 are simultaneously executed. Each of the drivers 216 may correspond to one of the software testing tools 210. At 503, each of the drivers 216 retrieves the test results from one of the storage locations 203 for the associated software testing tool. At 504, each of the drivers 216 determines mappings of source test case names for the software testing tool to target test names of selected test management tool, for example, from the mappings 208. At 505, each of the drivers 216 stores the test results with the associated mappings in the mappings 208. At 506, each of the drivers 216 executes a call to the API 220 for the test management tool 102 to connect the testing integration tool to the test management tool 102. At 507, each of the drivers 216 extracts, from the mappings 208, the test results and target test case names, and at 508, transmits, via the API 220, the extracted test results and the target test case names to the test management tool 102 for storage in the data repository 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A software integration testing tool comprising:
a data storage to store:
   drivers for a plurality of different software testing tools to test a system under test; and
   an application program interface for a test management tool;
memory to store machine readable instructions; and
a processor, connected to the memory, to execute the machine readable instructions to:
   determine configuration parameters for the plurality of different software testing tools, wherein the configuration parameters for each software testing tool comprise:
      source test case names for test cases to be executed by the software testing tool; and
      a storage location for the software testing tool to store test results from executing the test cases;
   determine configuration parameters for the test management tool, wherein the configuration parameters for the test management tool comprise target test case names used by the test management tool;
   for each software testing tool, store mappings in the data storage, wherein the mappings are between the source test case names of the software testing tool and a subset of the target test case names used by the test management tool that correspond to the source test case names of the software testing tool;
   execute the driver for each software testing tool to:
      determine, from the configuration parameters for the software testing tool, the storage location for the software testing tool to store the test results;
      retrieve the test results from the storage location;
      determine, from the stored mappings, mappings that are associated with the test results based on the source test case names for the software testing tool;
      store, in the data storage, the test results with the associated mappings;
      execute a call to the application program interface for the test management tool to connect the software integration testing tool to the test management tool;

extract, from the stored mappings, the test results and the target test case names associated with the source test case names of the software testing tool; and integrate, via the application program interface, the extracted test results and the target test case names with stored test results in a data repository of the test management tool.

2. The software integration testing tool of claim 1, wherein to execute the driver for each software testing tool comprises:
determine whether the test cases for the software testing tool are executed;
in response to determining the test cases were executed, perform the retrieval of the test results from the storage location; and
in response to determining the test cases were not executed, send instructions to the software testing tool to execute the test cases.

3. The software integration testing tool of claim 1, wherein to execute the driver for each software testing tool comprises:
determine whether a batch job including a plurality of the test cases for at least one of the plurality of software testing tools has completed execution of the plurality of the test cases;
in response to determining the batch job has completed, retrieve the test results for the plurality of the test cases to send to the test management tool via the application program interface; and
in response to determining the batch job has not completed, wait for the batch job to be completed to retrieve the test results.

4. The software integration testing tool of claim 3, wherein to wait for the batch job to complete comprises determining whether a flag has been set indicating the batch job has completed or poll the storage location for storing the test results to determine whether the batch job has completed.

5. The software integration testing tool of claim 1, wherein to retrieve the test results from the storage location comprises:
determine from the configuration parameters for the software testing tool, a file format of a test results file storing the test results for the test cases executed by the software testing tool;
open the test results file from the storage location;
parse the test results file according to the file format to identify the test results based on the source test case names; and
extract the identified test results from the test results file.

6. The software integration testing tool of claim 5, wherein to retrieve the test results from the storage location comprises:
determine a subset of a plurality of test cases executed by the software testing tool to extract; and
to extract the identified test results comprises extracting test results for the subset of plurality of test cases from the test results file.

7. The software integration testing tool of claim 6, wherein to determine the subset of the plurality of test cases comprises:
receive a request for the subset of the plurality of test cases from user input.

8. The software integration testing tool of claim 6, wherein to determine the subset of the plurality of test cases comprises:
receive a request for the subset of the plurality of test cases from the test management tool, wherein the test management tool identifies the subset of the plurality of test cases based on previously failed test cases and software updates that were implemented in response to the failed test cases.

9. The software integration testing tool of claim 8, wherein prior to extracting the identified test results, the driver is executed to:
send instructions to the software testing tool to execute the subset of the plurality of test cases.

10. The software integration testing tool of claim 1, wherein the processor is to execute the drivers simultaneously to retrieve the test results for the software testing tools in parallel.

11. The software integration testing tool of claim 1, wherein the processor is to execute a test metric analyzer module to:
track failure rates of the test cases executed by the software testing tools to test the system under test;
determine trends in the failure rates over a plurality of versions of the system under test; and
generate at least one of:
a visualization presenting the trends in a graphical user interface; and
an alert of the trends for transmission to at least one user.

12. The software integration testing tool of claim 1, wherein the data storage stores multiple drivers for multiple software testing tools and multiple application program interfaces for different test management tools, and the processor is to:
determine a selection of at least one of the multiple software testing tools; and
determine a selection of one of the test management tools, wherein
to execute the drivers comprises execute the stored drivers for the selected software testing tools; and
to execute a call to the application program interface comprises execute the call to the stored application program interface for the selected test management tool.

13. A software testing integration computer system comprising:
a data storage to store:
drivers for different software testing tools to test a system under test; and
application program interfaces for test management tools; and
a processor to:
determine a selection of a subset of the software testing tools;
determine a selection of one of the test management tools;
simultaneously execute each of the drivers for the selected software testing tools to retrieve test results from each selected software testing tool, wherein each executed driver is to:
determine, from configuration parameters for the software testing tool associated with the driver, a storage location for the software testing tool to store the test results for the software testing tool;
retrieve the test results from the storage location;
determine mappings of source test case names for the software testing tool to target test names of selected test management tool;
store the test results with the associated mappings;

execute a call to the application program interface for the selected test management tool to connect the software integration testing tool to the test management tool;

extract, from the stored mappings, the test results and target test case names; and send, via the application program interface, the extracted test results and the target test case names to the test management tool.

14. The software testing integration computer system of claim 13, wherein each executed driver is to:

determine whether test cases for the software testing tool are executed;

in response to determining the test cases were executed, perform the retrieval of the test results from the storage location; and in response to determining the test cases were not executed, send instructions to the software testing tool to execute the test cases.

15. The software testing integration computer system of claim 13, wherein each executed driver is to:

determine whether a batch job including a plurality of the test cases for at least one of the plurality of software testing tools has completed execution of the plurality of the test cases;

in response to determining the batch job has completed, retrieve the test results for the plurality of the test cases to send to the test management tool via the application program interface; and in response to determining the batch job has not completed, wait for the batch job to be completed to retrieve the test results.

16. The software testing integration computer system of claim 15, wherein to wait for the batch job to complete comprises determining whether a flag has been set indicating the batch job has completed or poll the storage location for storing the test results to determine whether the batch job has completed.

17. The software testing integration computer system of claim 13, wherein to retrieve the test results from the storage location comprises:

determine from the configuration parameters for the software testing tool, a file format of a test results file storing the test results for the test cases executed by the software testing tool;

open the test results file from the storage location;

parse the test results file according to the file format to identify the test results based on the source test case names; and extract the identified test results from the test results file.

18. The software testing integration computer system of claim 17, wherein to retrieve the test results from the storage location comprises:

determine a subset of a plurality of test cases executed by the software testing tool to extract; and to extract the identified test results comprises extracting test results for the subset of plurality of test cases from the test results file.

19. A method for simultaneously executing drivers for software testing tools to retrieve test results from each software testing tool, wherein for each software testing tool, the method comprises:

determining, from configuration parameters for the software testing tool, a storage location for the software testing tool to store the test results for the software testing tool;

retrieving the test results from the storage location;

determining mappings of source test case names for the software testing tool to target test names of selected test management tool;

storing the test results with the associated mappings;

executing a call to an application program interface for a test management tool to connect the software integration testing tool to the test management tool;

extracting, from the mappings, the test results and target test case names; and transmitting, via the application program interface, the extracted test results and the target test case names to the test management tool.

20. The method of claim 19, wherein transmitting, via the application the extracted test results comprises uploading the extracted test results to the test management tool via the application program interface.

* * * * *